July 27, 1965

G. W. HINDS 3,197,539

METHOD OF OPERATING ELECTRIC ARC FURNACE

Filed July 11, 1962

INVENTOR.
GENE W. HINDS
BY Richard S. Shreve, Jr
ATTORNEY

July 27, 1965    G. W. HINDS    3,197,539
METHOD OF OPERATING ELECTRIC ARC FURNACE
Filed July 11, 1962    2 Sheets-Sheet 2

SCRAP TEMPERATURE PROFILE DURING MELT DOWN

RELATIVE MELTING TIME

INVENTOR.
GENE W. HINDS
BY Richard S. Shreve Jr.
ATTORNEY 3,197,539
METHOD OF OPERATING ELECTRIC ARC FURNACE
Gene W. Hinds, Westfield, N.J., assignor to Union Carbide Corporation, a corporation of New York
Filed July 11, 1962, Ser. No. 209,187
5 Claims. (Cl. 13—9)

This invention relates to metallurgical furnaces of the electric arc type and more particularly to a method of operating such a furnace in order to increase its normal productivity and overall efficiency.

Electric arc furnaces have certain disadvantages when compared with other furnaces used throughout the metallurgical industry; the large consumption of power, and rapid refractory wear during the melt-down period being the most significant. The melting period also consumes considerable time and is the most expensive period in electric furnace operation because it is during this period that efficiency of heat transfer is at its lowest, and power and electrode consumption are at their highest.

Normally, the furnace arc is subjected to erratic dislocations during the melt-down period, moving around the end of the electrode, flashing over to one side, and alternately lengthening and shortening the arc. Freqently, the arc drifts to one side of the electrode to such an extent that it becomes extinguished. These fluctuations in arc length change the arc resistance, causing rapid fluctuations and swings in arc voltage, arc current and arc power, and incur added equipment expenses and increased power costs due to unsteady loads upon the power network.

Another difficulty in the arcing that occurs between the electrode and the melt involves the amount and rate at which energy is supplied by the arc. A short arc having a low resistivity supplies less heat energy than a longer arc. Because of this relationship between arc length and supply of heat energy, a short arc can be a disadvantage when it is desired to supply increased power to the arc. On the other hand, too long an arc may also be undesirable, since long arcs are known to be inefficient.

Another difficulty which exists presently during the scrap melting period is the sharp temperature gradient from the electrodes to the walls of the furnace. With the sole heat source being the electrodes which are located centrally within the furnace, melting takes place around the electrode periphery and moves outward toward the walls. Unlike a substantial amount of the charged scrap is completely melted, the overall heat transfer efficiency is very poor because the overall effective temperature difference between the scrap and the heat source is relatively low due to the sharp temperature gradients within the furnace. This is exemplified by the fact that the melting operation currently consumes as much as three times the power required during the refining period.

Heretofore, local overheating in the immediate neighbor hood of the arc has also been unavoidable. This overheating is a definite factor affecting the wear upon the furnace roof refractory; a factor which diminishes with lower power consumption and shorter arcs. It should thus be appreciated that present day operational practice with electric arc type furnaces is a compromise between scrap melting rate and refractory wear, and that the meltdown period continues to be the slowest and most inefficient period of electric arc furnace operation.

It is therefore the main object of this invention to overcome the above-mentioned disadvantages by providing an improved method of operating an electric-arc type furnace.

Other objects are to substantially increase the useful productivity of electric arc type furnaces without causing localized overheating around the electrodes and corresponding increased refractory wear, to provide for a more even and more rapid meltdown of scrap material in an electric furnace by altering the temperature gradients therein while at the same time, controlling the overall heat input to said furnace, and to provide a method of furnace operation wherein a rapid and more efficient melting of scrap will take place with a minimum amount of wear to the furnace refractory.

It will be understood that the invention herein disclosed, although particularly applicable to the manufacture of steel and related products, may be extended to other fields of use such as, for example, ferroalloys, copper, nickel etc.

In accomplishing the objects hereinbefore recited, I have concerned myself primarily with the period of electric furnace operation in which the scrap is melted since it is during this period that my invention will produce the most beneficial results. In brief, my invention consists of establishing a high temperature zone, preferably in the form of an annular ring, midway between the electrode pitch diameter and the walls of the furnace.

In order to establish this high temperature zone, I prefer to utilize a plurality of oxygen-fuel burners positioned in the roof of the electric furnace. The burners are preferably located on a circle, the diameter of which lies midway between the refractory walls of the furnace and an imaginary circle circumscribed through the electrodes (electrode pitch diameter). The burners are also preferably positioned at an angle with the vertical such that there will be an overlapping of flames impinging upon the scrap, thus forming an annular zone of flames.

By establishing a high temperature zone as aforementioned, the dual heat sources provided by the electrodes and burners combination will level out the sharply sloped temperature gradients existing within the furnace which occurs when the furnace is operated with electrodes alone, as per current practice. This, in turn, will provide a higher overall effective temperature difference between the source of heat and the cold scrap, a factor which will result in faster and more efficient heat transfer.

In practicing my method of electric furnace operation, it would be advantageous to regulate the power to the electrodes so that a short arc is produced during the scrap meltdown period thus minimizing refractory wear. As soon as the charged scrap has been substantially melted, the burners are preferably shut off, and thereon until the end of the heat, conventional electric furnace practice should prevail. It should be noted, however, that the burners can also be used for maintaining or increasing bath temperature during tapping, for thinning sluggish slag during refining, for keeping the furnace hot while draining after tap, and for "burning in" bottom and bank refractory repair material.

Figure 3:
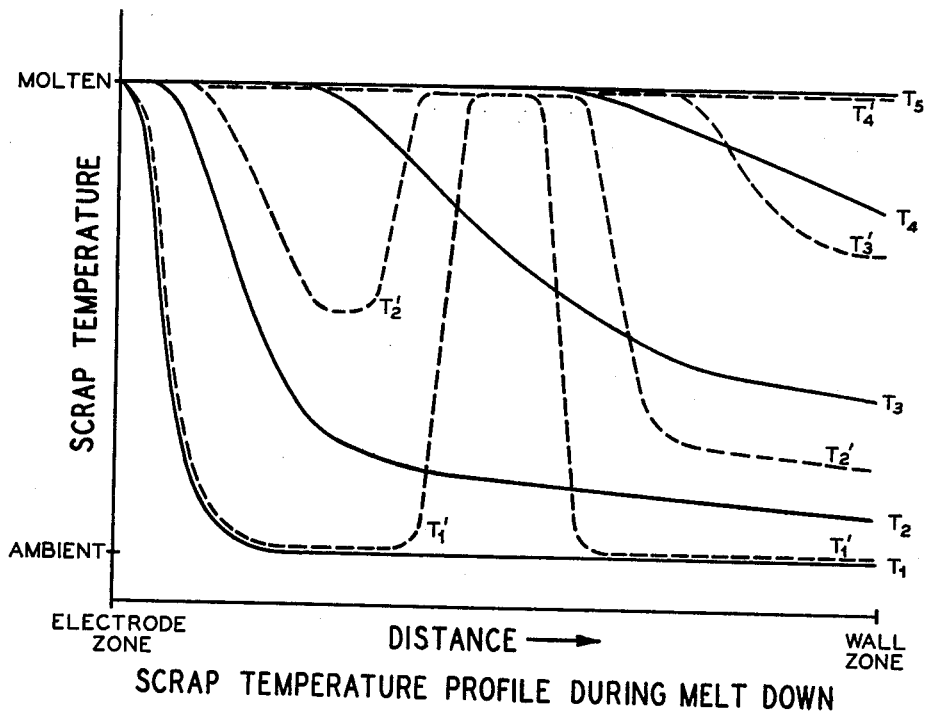
Figure 4:
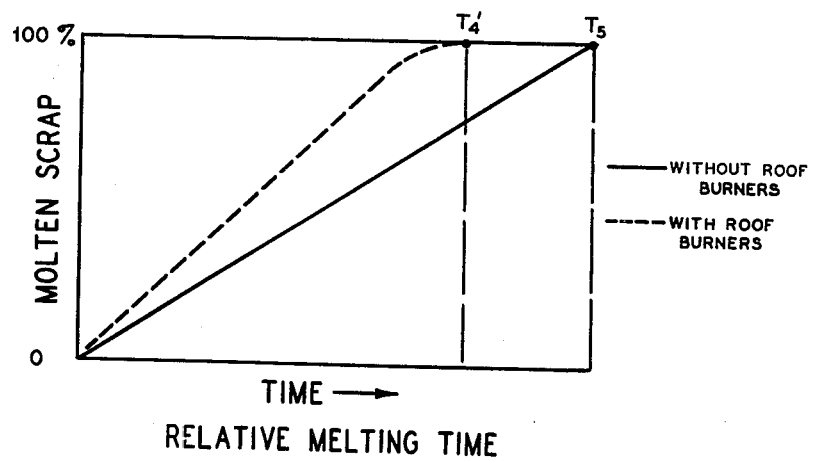

FIG. 3 is a diagram in the form of a graph showing the temperature profile across the furnace interior after the furnace has been charged with scrap. Solid lines designate the gradient to be expected with conventional practice while broken lines indicate the gradient to be expected with the furnace operated in accordance with my invention; and FIG. 4 is a diagram in the nature of a graph plotting the percentage of molten scrap vs. the time necessary to melt such scrap. Again solid lines indicate conventional operation whereas broken lines indicate operation in accordance with my invention.

Figure 1:
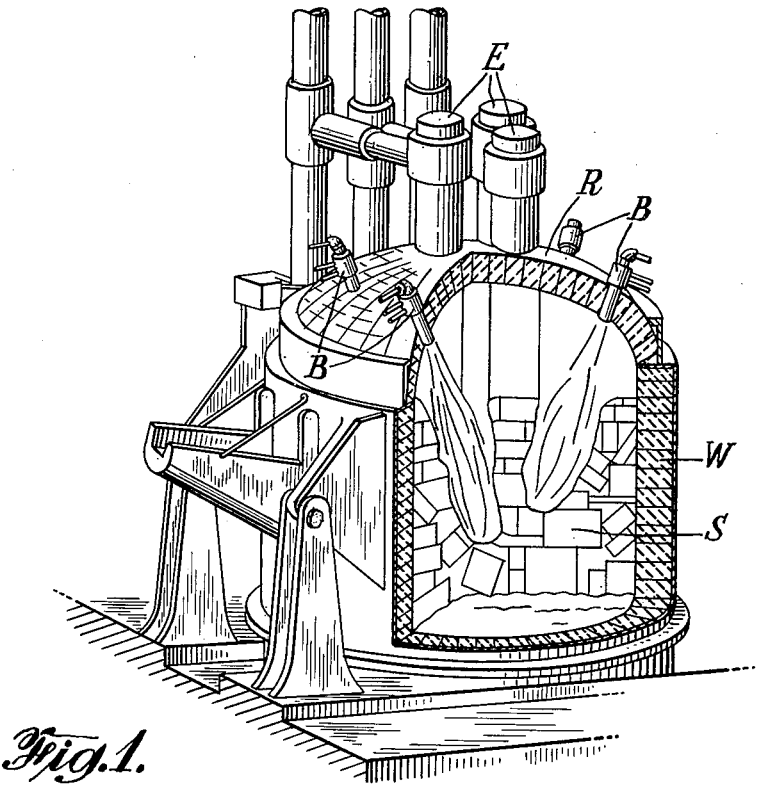
FIG. 1 is a perspective view, partly in cross-section of a metallurgical furnace of the electric arc type, illustrating a preferred embodiment of the present invention.

Referring to FIG. 1, there is shown an electric arc type furnace used commonly for the manufacture of steel which has, in accordance with my invention, been equipped with high energy input oxy-fuel fired roof burners. As shown therein, the burners B are preferably located in the roof R on a circle, the diameter of which lies midway between the refractory walls W of the furnace and an imaginary circle circumscribed through the electrodes E (electrode pitch diameter). The burners are also preferably positioned at an angle with the vertical such that there will be an overlapping of flames impinging upon the scrap S, thus forming an annular zone of flames.

Figure 2:
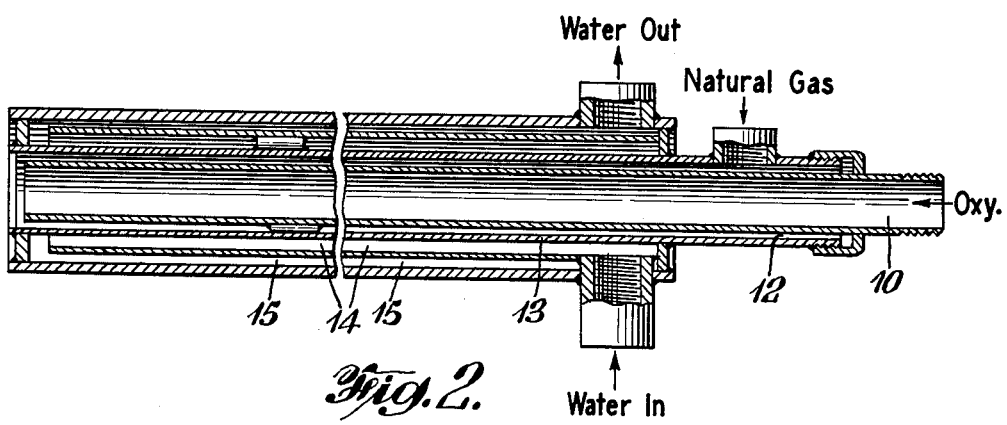
FIG. 2 is an enlarged sectional view of a burner shown in FIG. 1.

Referring now to FIG. 2, oxygen flows through a center pipe 10 of material, such as stainless steel, suitable for use with oxygen at elevated temperature. Fuel gas flows through the annulus 12 formed between the center oxygen pipe 10 and a concentric outer pipe 13. This assembly may, if desired, be surrounded by a water jacket, wherein a continuous flow of cooling water is maintained by means of annular water "in" passage 14 and annular water "out" passage 15.

Flowrates may be established in accordance with data contained in the following Table I by appropriate adjustments at the control panel.

TABLE I

*Representative oxygen and fuel gas flow for scrap meltdown in electric furnaces*

| Furnace Size, Tons | Number of Burners | Flowrate/Burner | | Total Flowrate | |
|---|---|---|---|---|---|
| | | Oxygen, c.f.h. | Gas, c.f.h. | Oxygen, c.f.h. | Gas, c.f.h. |
| 50 | 6 | 6,000 | 3,330 | 36,000 | 20,000 |
| 80 | 6 | 7,500 | 4,170 | 45,000 | 25,000 |
| 100 | 9 | 8,000 | 4,450 | 72,000 | 40,000 |
| 150 | 12 | 8,340 | 4,170 | 100,000 | 50,000 |

Evaluation tests in a 140 ton electric furnace produced the following results when 12 burners were fired through the roof at flowrates of 8,340 c.f.h. oxygen and 4,170 c.f.h. natural gas each. Total heat time was reduced 21.5 percent from 2 hours 57 minutes to 2 hours 19 minutes. Meltdown power decreased 17.6 percent from 519 kwh./ton to 428 kwh./ton. Oxygen and natural gas consumption was 755 c.f./ton and 366 c.f./ton respectively. Total burner flowrates are dependent upon transformer size, furnace production rate increase desired, and furnace condition.

My copending application Serial No. 856,725 filed December 2, 1959, now abandoned, also teaches a novel method of achieving a rapid scrap meltdown in electric furnaces. In that application, is taught the use of tangentially positioned wall burners to direct high temperature flames against an area of charged scrap located between the electrodes and the furnace lining. At that time, representative oxygen requirements were considerably lower than the quantities proposed herein. Whereas 40,000 c.f.h. was representative for a 200-ton electric furnace at that time, 160,000 to 240,000 c.f.h. and above are now proposed. To introduce such large quantities of oxygen and fuel by adding additional wall burners would be impracticable, if not physically impossible. This is due to the limited space available around the outside periphery of an electric furnace, for wall burner installation. The utilization of a multiplicity of oxygen-fuel fired burners positioned in the roof of an electric furnace, however, has produced excellent results. With this method of operation, a number of burners spaced around the roof of the furnace can direct "blasts of flame," preferably forming an annular impingement pattern, against the charged scrap in the furnace.

Referring now to FIG. 3, there is shown a temperature profile comparison between the use of roof burners as taught herein and prior art conventional electric furnace practice. The temperature profiles exemplify portion of the scrap meltdown period after the scrap has been charged and the sources of heat have been turned on. FIGS. 3 and 4 both illustrate the fact that a marked decrease in scrap melting time results when a furnace is operated in accordance with my invention. In FIG. 3, $T_1$ and $T_1^1$, $T_2$ and $T_2^1$, $T_3$ and $T_3^1$, $T_4$ and $T_4^1$ each represent a given time period from the moment power for melting is turned on. Of course, for the same time period, for example $T_3$ and $T_3^1$, it is apparent that more scrap has been melted with roof burner operation as taught herein than with only electric melting means according to conventional practice. It can be seen that temperature gradients are shown at different time periods from $T_1$ when scrap melting first begins until all the scrap is molten. It is important to note that with roof burners positioned as taught by my invention, a molten pool is formed approximately midway between the electrode circle and the wall of the furnace. Melting thus proceeds in two separate areas. Further, because of this auxiliary heat source, which is critically positioned as aforedescribed, melting proceeds at a more efficient rate when compared with the limited number of burners possible when positioned in the furnace wall to fire tangentially.

From the above description, it can be appreciated that with conventional practice (solid lines) a sharply sloping temperature curve exists across the furnace shortly after power is turned on. This is, of course, undesirable from a standpoint of production efficiency. By comparison, the additional heat source furnished by oxygen-fuel fired roof burners as aforedescribed alters the temperature distribution within the furnace such that a higher average scrap temperature exists across the furnace profile. This operates to produce a greater and more efficient transfer of heat per unit time, which is one of the primary objects of my invention.

Operation of an electric furnace in accordance with my invention has production advantages; it can be seen that the poorly sloped temperature gradients have been eliminated and that more even temperature conditions have been established. Moreover, by addition of oxy-fuel roof burners evenly distributed around the furnace as previously described, it is possible to reduce the power to the electrodes if desired and maintain normal production rates, as well as eliminating the peaks in power demand. The melting efficiency of the electrodes will also increase as a result of a more stable arc length due to the rapid and constant movement of scrap from the sides of the furnace downward and toward the center thereof. Burner use is especially helpful during periods of power interruption. In this connection, it is appropriate to mention that my invention also contemplates the use of roof fire oxygen-fuel burners as the sole source of heat for melting scrap in an electric furnace.

The use of my invention has been found to result in increased steel production, reduced scrap melting time, decreased power consumption and more uniform scrap melting rates.

What is claimed is:

1. In the method of melting scrap in an electric arc-furnace, in which the scrap is charged into the furnace, the electrodes are lowered, the melting current is turned on, and heat is applied to the scrap by the electrodes in the furnace, the improvement which comprises passing streams of fuel and an oxidant down through the roof from stations spaced therearound in a circle between the electrodes and the furnace walls, to form a combustible mixture, igniting said mixture to provide post-mixed flames, and directing said flames into the charged scrap at locations between the electrodes and the lining of the furnace.

2. Method as claimed in claim 1, in which said stations are spaced around the roof in an inner circle concentric to the furnace wall, and said flames are spaced intermediate the electrodes and the furnace walls, and said flames are inclined inwardly to form a substantially circumferentially continuous inverted frusto conical flame pattern.

3. Apparatus for melting scrap in an electric arc furnace having circular walls and a roof through which electrodes are suspended, and to which heat is supplied by said electrodes, the improvement which comprises means for passing streams of fuel and oxidant down through the roof from stations spaced therearound between the electrodes and the furnace walls, thereby forming combustible mixtures which upon ignition form high intensity post-mixed flames directed into the scrap within the furnace.

4. Apparatus as claimed in claim 3, in which said means are spaced around the roof in an inner circle concentric to the furnace wall, said stream passing and flame directing means comprising burners passing through the furnace roof and spaced intermediate the electrodes and furnace wall, and said burners are directed inwardly to form a substantially continuous inverted frusto-conical flame pattern.

5. Apparatus for melting scrap in an electric arc furnace having circular walls and a roof through which electrodes are suspended, and to which heat is supplied by said electrodes, the improvement which comprises burners passing through the roof from stations spaced therearound and spaced intermediate the electrodes and the furnace wall, and said burners are directed inwardly to form a substantially inverted frusto conical flame pattern, each of said burners comprising a central conduit having upper and lower ends, the lower end terminating at the burner face, means for providing the upper end of said conduit with a flow of oxygen to cause said oxygen to leave the lower end of said conduit at high velocity, a second conduit outwardly spaced from said central conduit defining an annular passage therebetween, means for introducing a flow of fuel to said passage, said second conduit disposed to direct a stream of fuel in a direction substantially concentric with said central conduit to form a well atomized post-mixed combustible mixture with said oxygen stream which, upon ignition will produce a high intensity post-mixed flame.

References Cited by the Examiner
UNITED STATES PATENTS

| | | | |
|---|---|---|---|
| 1,104,017 | 7/14 | Szocs | 158—110 |
| 1,321,056 | 11/19 | Kirke | 158—110 |
| 2,106,456 | 1/38 | Howard et al. | 13—2 |
| 2,117,968 | 5/38 | Lutherer | 158—99 |
| 2,377,497 | 6/45 | Hopkins | 158—99 |
| 2,927,142 | 3/60 | La Bate | 13—2 |

RICHARD M. WOOD, *Primary Examiner.*

JOSEPH V. TRUHE, Sr., *Examiner.*